United States Patent [19]

Kashiwada et al.

[11] 4,149,989

[45] Apr. 17, 1979

[54] PROCESS FOR PRODUCING PHOSPHORS

[75] Inventors: Yasutoshi Kashiwada, Tokyo; Shinkichi Tanimizu, Kokubunji; Atsushi Suzuki, Hachioji; Yoshio Furuhata, Kodaira, all of Japan

[73] Assignee: Hitachi, Ltd., Japan

[21] Appl. No.: 882,018

[22] Filed: Feb. 28, 1978

[30] Foreign Application Priority Data

Mar. 2, 1977 [JP] Japan .................................. 52-21527

[51] Int. Cl.$^2$ ............................................. C09K 11/46
[52] U.S. Cl. ............................. 252/301.4 P; 423/263; 423/306
[58] Field of Search ................. 252/301.4 P; 423/263, 423/306

[56] References Cited

U.S. PATENT DOCUMENTS 4,000,247 12/1976 Yamada et al. ........... 252/301.4 P X

OTHER PUBLICATIONS

Yamada et al., "Journal of Applied Physics," vol. 45, No. 11, pp. 5096–5097, 1974.

*Primary Examiner*—Jack Cooper
*Attorney, Agent, or Firm*—Craig & Antonelli

[57] ABSTRACT

Infrared-infrared phosphors having a composition represented by the general formula $$AB_{1-x-y}Nd_xYb_yP_4O_{12}$$

wherein A is at least one element selected from the group consisting of Na, K, Rb and Cs, B is at least one element selected from the group consisting of Sc, Y, La, Ce, Gd, Lu, Ga, In, Bi and Sb, and x and y are numbers satisfying the conditions $$0.05 \leq x \leq 1.0$$

$$0 \leq y \leq 0.95$$

$$x + y \leq 1.0$$

can be produced in the form of very fine particles and in a high yield by carrying out firing in the presence of a melt comprising a compound of the formula $$APO_3$$

wherein A is as defined above, and in such a specific composition and such a specific temperature range as said phosphor may be crystallized out.

4 Claims, 7 Drawing Figures

PROCESS FOR PRODUCING PHOSPHORS

LIST OF PRIOR ART (37 CFR 1.56 (a))

The following reference is cited to show the state of the art:

Japanese Patent Kokai (Laid-Open) No. 152694/75 This reference discloses single crystals for laser such as $LiNdP_4O_{12}$. Although the compositions of the single crystals are similar to those of the phosphors of the present invention, no process for pulverizing the single crystals is shown in the reference.

The present invention relates to a process for producing phosphors. More particularly, the invention pertains to a process for producing infrared-infrared phosphors (The term "infrared-infrared phosphors" used herein means phosphors which are excited by infrared rays and thereby emit infrared rays.) having a composition represented by the general formula $$AB_{1-x-y}Nd_xYb_yP_4O_{12}$$

wherein A is at least one element selected from the group consisting of Na, K, Rb and Cs, B is at least one element selected from the group consisting of Sc, Y, La, Ce, Gd, Lu, Ga, In, Bi and Sb, and x and y are numbers satisfying the conditions $$0.05 \leq x \leq 1.0$$

$$0 \leq y \leq 0.95$$

$$x + y \leq 1.0$$

in the form of very fine particles and in a high yield.

Infrared-infrared phosphors have been hardly developed owing to their limited use, but have many advantages in that their luminescence is invisible to the naked eye and thereby they are suitable for maintaining a secret and they are less affected by soil. Therefore, the phosphors have recently come to be often used in various identification cards such as credit card and tickets. In order to be employed in these uses, it is required for the phosphors to have a strong luminous power and a luminous wavelength suited to the sensitivity characteristics of a luminescence receiver and to be able to receive infrared rays at a high sensitivity.

As phosphors satisfying such requirements, one of the present inventors et al proposed infrared-infrared phosphors represented by the general formula $$AB_{1-x-y}Nd_xYb_yP_4O_{12}$$

wherein A, B, x and y are as defined above (U.S. patent application Ser. No. 846,535, filed Oct. 28, 1977, Japanese Patent Application No. 135,333/76).

When the phosphors were synthesized from stoichiometric amounts of starting materials, however, the resulting phosphors solidified into lumps and thereby it was difficult for the phosphors to obtain a high luminous power. Therefore, the products were unable to be used in printing and other uses.

An object of the present invention is to provide a process for producing infrared-infrared phosphors represented by the general formula $$AB_{1-x-y}Nd_xYb_yP_4O_{12}$$

wherein A, B, x and y are as defined above, in the form of very fine particles and in a high yield, which process has solved the above-mentioned problems in the prior art process.

According to the present invention, there is provided a process for producing an infrared-infrared phosphor represented by the formula $$AB_{1-x-y}Nd_xYb_yP_4O_{12}$$

wherein A, B, x and y are as defined above, which comprises the steps of:

(a) mixing the appointed starting materials;
(b) heating the resulting mixture so that firing may be carried out in a composition within the region $\beta$ in FIG. 2 in the accompanying drawing;
(c) cooling the fired mixture;
(d) digesting the cooled mixture with water; and
(e) removing a liquid phase and then drying the insoluble residue.

In the accompanying drawing.

Figure 1:
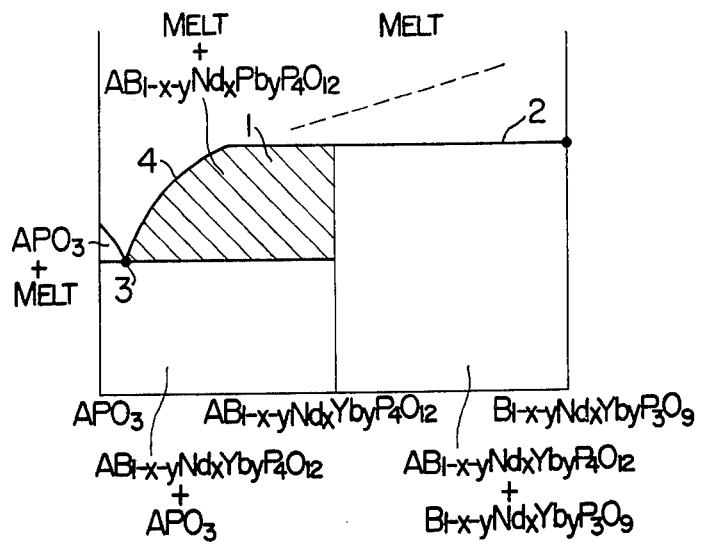
FIG. 1 is a phase diagram of $APO_3$-$B_{1-x-y}Nd_x$-$Yb_yP_3O_9$ pseudo binary system.

In FIG. 1 which is a phase diagram of $APO_3$-$B_{1-x-y}Nd_xYb_yP_3O_9$ pseudo-binary system, a shaded region 1 is the region wherein said phosphor of the formula $$AB_{1-x-y}Nd_xYb_yP_4O_{12}$$

exists together with a melt comprising $APO_3$, a line 2 parallel with the abscissa represents the incongruently melting temperature of the phosphor, a point 3 represents the eutectic point of $AB_{1-x-y}Nd_xYb_yP_4O_{12}$ and $APO_3$, and a curve 4 represents a liquidus line.

The region in FIG. 1 wherein said phosphor $AB_{1-x-y}Nd_xYb_yP_4O_{12}$ can be obtained in the form of fine particles is said region 1. In the region 1, the phosphor $AB_{1-x-y}Nd_xYb_yP_4O_{12}$ exists together with a melt comprising $APO_3$ as described above, and $APO_3$ exists in an amount in excess of its stoichiometric composition.

Figure 2:
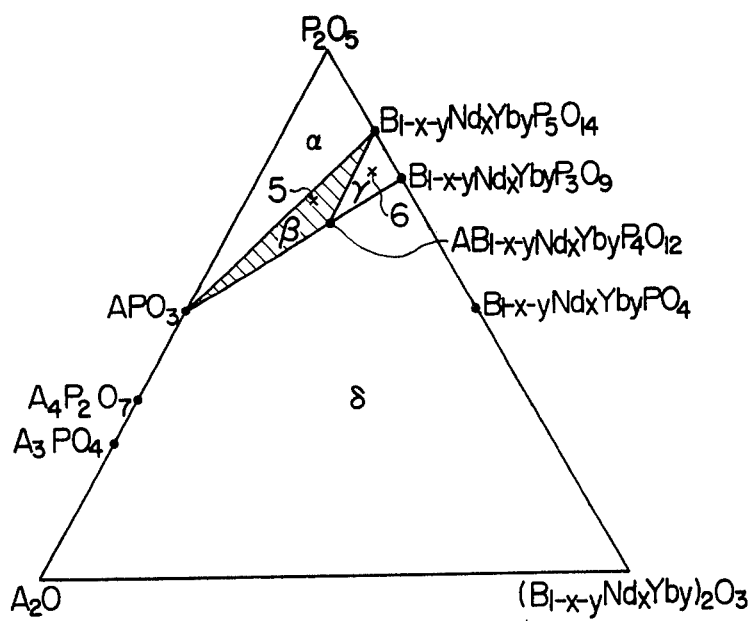
FIG. 2 is a composition diagram of $P_2O_5$-$A_2O$-$(B_{1-x-y}Nd_2Yb_y)_2O_3$ ternary system.

Also, very fine particles (particle size 5 μm or less) of the phosphor can be formed from a composition within a shaded region $\beta$ in FIG. 2 which is a composition diagram of $P_2O_5$-$A_2O$-$(B_{1-x}Nd_2Nb_y)_2O_3$ ternary system.

Thus, in the present invention, firing may be carried out in the region wherein a melt comprising $APO_3$ exists together with the phosphor as described above. In order to form fine particles of the phosphor having a large luminous strength in a high yield, however, firing is carried out and the phosphor is crystallized out within the region $\beta$ surrounded by three points $APO_3$, $AB_{1-x-y}Nd_xYb_yP_4O_{12}$ and $B_{1-x-y}Nd_xYb_yP_5O_{14}$ in FIG. 2.

Figure 3:
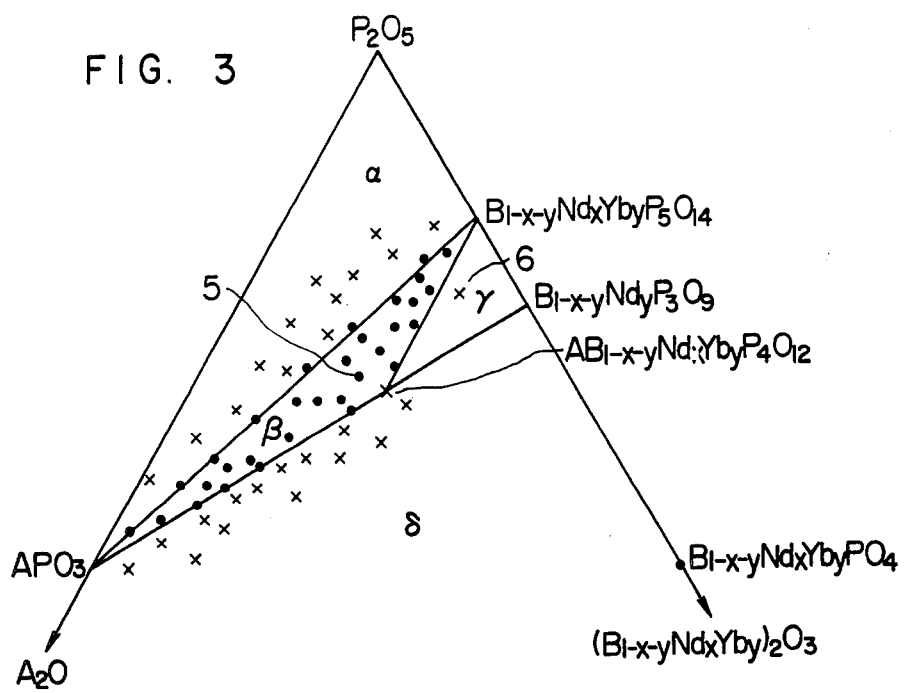
FIG. 3 is a partial enlargement of FIG. 2 wherein experimental results have been entered.

A partial enlargement of FIG. 2 is FIG. 3 in which experimental results have been entered. In FIG. 3, points represented by "•" are the points wherein bright fine particles of the phosphor were obtained in a yield of 30% or more, and points represented by "X" are the points wherein the yield of the fine particles of phosphor was less than 30% or the luminous strength of the phosphor was reduced by the presence of $(B_{1-x-y}Nd_xYb_y)PO_4$ even if the yield was high.

As is clear from FIG. 3, a preferable result can always be obtained if firing is carried out with a composition within the range $\beta$. However, the result obtained at a point $AB_{1-x-y}Nd_xYb_yP_4O_{12}$ was poor. The reason therefor is that the above-mentioned phosphor is formed from a condition free from a melt comprising $APO_3$ at this point.

When the synthesis of phosphors is carried out under the phase equilibrium as shown in FIG. 2, a part of $P_2O_5$ is generally scattered and lost during the firing step and the composition of the mixture becomes different from the starting compositions during the synthesis. In the synthesis of phosphors according to such a usual process, one starting composition ratio $(B_{1-x-y}Nd_xYb_y)_2O_3/A_2O$ is kept constant and another starting composition ratio $(B_{1-x-y}Nd_xYb_y)_2O_3/P_2O_5$ is varied to examine the yield of fine particles of phosphor. In this case, the highest yield is obtained on or near a line connecting the point $APO_3$ to the point $B_{1-x-y}Nd_xYb_yP_5O_{14}$ in FIG. 2.

Also, the smaller the starting composition ratio $(B_{1-x-y}Nd_xYb_y)_2O_3/A_2O$, the higher the yield of fine particles of phosphor. If the starting composition ratio is too small, however, the yield rather decreases. As is seen from FIGS. 5 and 6, it is preferable to use the starting compositions on and near the line connecting the point $APO_3$ to the point $B_{1-x-y}Nd_xYb_yP_5O_{14}$.

In the regions $\alpha$ and $\delta$ in FIG. 2, phosphors having the above-mentioned composition can not be formed. Also, in the region $\gamma$, phosphors having the above-mentioned composition can be formed but the fine particles of phosphor can not be formed. Therefore, the phosphors obtained in the region $\gamma$ are unpractical. On the other hand, if firing is carried out within the region $\beta$, the fine particles of phosphor can be obtained in a yield of 30% by weight or more.

The following examples illustrate the present invention in more detail.

EXAMPLE 1

In order to synthesize a phosphor of the formula

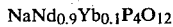
NaNd$_{0.9}$Yb$_{0.1}$P$_4$O$_{12}$ corresponding to the general formula

AB$_{1-x-y}$Nd$_x$Yb$_y$P$_4$O$_{12}$ wherein A=Na, x=0.9 and y=0.1, the following powdery materials were used so that the starting material may have a composition ratio as shown at point 5 in FIG. 2 (Na$_2$O:Nd$_2$O$_3$:Yb$_2$O$_3$:P$_2$O$_5$=1.5:0.9:0.1:6 as a molar ratio):
Nd$_2$O$_3$: 414.83 g
Yb$_2$O$_3$: 53.98 g
Na$_2$CO$_3$: 217.78 g
NH$_4$H$_2$PO$_4$: 1890.83 g These powdery materials were sufficiently mixed, charged into a platinum crucible, and then fired in air at 700° C. for 2 hours.

After the completion of firing, water was poured onto the solid matter in the platinum crucible to boil the water and the sludgy contents were then removed from the platinum crucible. The contents were classified by decantation, etc. to obtain fine particles of a phosphor. After leaching with water, the insoluble residue were well shaken with 1N nitric acid to remove the APO$_3$ completely. Thus, a further more preferable result was obtained. It is, of course, possible to use the acid from the start without the use of water in this case.

The particle size of the thus obtained phosphor was measured by a Blain air permeability apparatus to determine a ratio of the yield of fine particles of 5.1 µm or less in diameter to the total yield. Thus, it was found that the ratio of the fine particles to the total yield was greatly affected by the heating rate at which the powdery materials were heated from room temperature to 700° C.

The yield of fine particles of phosphor obtained when the heating rate from room temperature to 700° C. was 350° C./hour, that obtained when the heating rate was 150° C./hour from room temperature to 400° C. and 350° C./hour from 400° C. to 700° C., and that obtained when the heating rate was 40° C./hour from room temperature to 400° C. and 350° C./hour from 400° C. to 700° C. were 41.9% by weight, 65.2% by weight and 82.6% by weight, respectively.

The heating rate which can be practiced in the present invention ranges from about 10° C./hour to 350° C./hour. A heating rate of about 150° C./hour gives the most preferable result in view of the practical conditions such as the firing time required.

EXAMPLE 2

A relationship between a firing temperature and the yield of fine particles of phosphor was obtained by using the same composition of the material as that in Example 1 and setting the heating rate from room temperature to the firing temperature and the firing time to 200° C./hour and 2 hours, respectively. The other conditions were the same as in Example 1.

Figure 4:
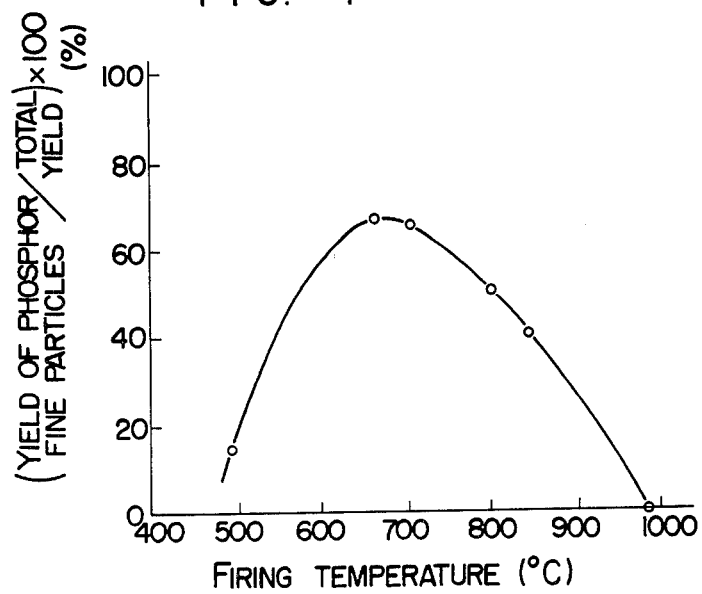
FIG. 4 shows a relationship between firing temperature and the yield of fine particles of phosphor.

The results obtained are shown in FIG. 4. As is clear from FIG. 4, the firing temperature at which a yield of fine particles of phosphor of 30% by weight or more can be obtained is about 520° C. to about 880° C., and preferably 550° to 850° C. Also, the firing temperature at which the most preferable result can be obtained is 600° to 750° C. and a yield of about 60% by weight or more can be obtained.

Particularly, when the firing temperature exceeds about 970° C., NaNd$_{0.9}$Yb$_{0.1}$P$_4$O$_{12}$ is molten and decomposed and no fine particles of phosphor can be obtained. It is also the case with regard to the other phosphors.

EXAMPLE 3

The same powdery materials as those used in Example 1 were charged into a platinum crucible and heated to 700° C. at a heating rate of 150° C./hour from room temperature to 400° C. and 350° C./hour from 400° C. to 700° C. Firing was carried out in air at 700° C. for 2 hours to obtain a phosphor.

After firing, half of the product was subjected to the same warm water-treatment and acid-washing as in Example 1 (except that nitric acid was replaced by phosphoric acid). The remaining half of the product was subjected to the warm water-treatment only. The yield of fine particles of phosphor obtained by the former treatment was compared with that obtained by the latter treatment.

As a result, it was found that only warm water-treatment gave a yield of 54.5% by weight while a combination of warm water-treatment and then phosphoric acid-treatment gave a yield of 65.2% by weight. Thus, it was found that acid-washing was very effective.

As is clear from FIG. 1, when a melt having a composition within the region 1 is cooled, $APO_3$ ($NaPO_3$ in this case) is crystallized out together with the desired phosphor and acts as a bonding agent. It is presumed that the acid-treatment facilitates the removal of $NaPO_3$ as a bonding agent and thereby increases the yield of fine particles of phosphor.

Therefore, the acid used in the washing may be any acid which can dissolve $APO_3$ well. For example, hydrochloric acid, phosphoric acid, nitric acid, sulfuric acid and various organic acids may be used. Even if the concentration of the acid is low, the treatment time required becomes longer but almost the same effect can be obtained.

After classification treatment, the acid or water is removed by any conventional means, and the insoluble residue is dried to obtain the desired fine particles of phosphor.

EXAMPLE 4

In the synthesis of a phosphor represented by the formula

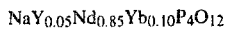

corresponding to the general formula

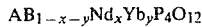

wherein $A = Na$, $B = Y$, $x = 0.85$ and $y = 0.10$, a relationship between a molar ratio of the starting materials $(Y_{0.05}Nd_{0.85}Yb_{0.10})_2O_3/P_2O_5$ (p) or a molar ratio of the starting materials $(Y_{0.05}Nd_{0.85}Yb_{0.10})_2O_3/Na_2O$ (q) and the yield of fine particles of phosphor was examined. The results obtained are as shown in FIGS. 5 and 6.

Figure 5:
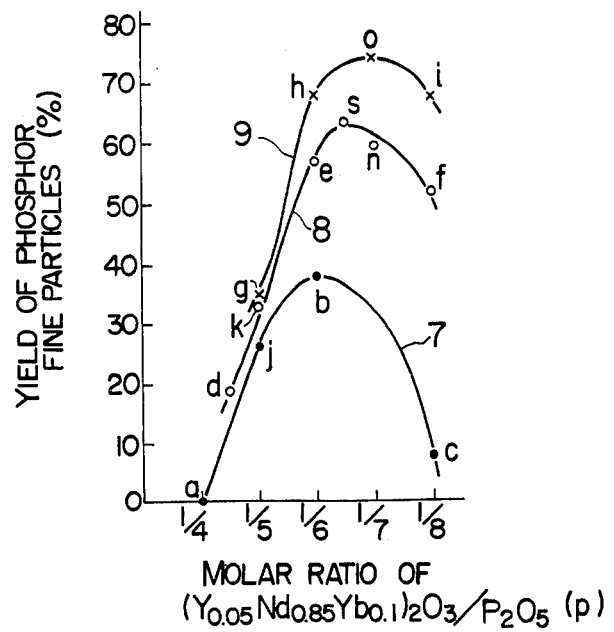
FIGS. 5 and 6 show a relationship between the starting composition and the yield of fine particles of phosphor.

In FIG. 5, curves 7, 8 and 9 represent a relationship between p and the yield of fine particles of phosphor at $q = 1/1$, $1/1.5$ and $1/2$, respectively. Likewise, in FIG. 6, curves 10, 11, 12 and 13 represent a relationship between q and the yield of fine particles of phosphor at $p = 1/5$, $1/6$, $1/7$ and $1/8$, respectively.

The stoichiometric molar ratios in the composition of said phosphor correspond to point a in FIG. 5 ($p = 1/4$, $q = 1/1$). Therefore, it is seen that the yield is zero.

Figure 6:
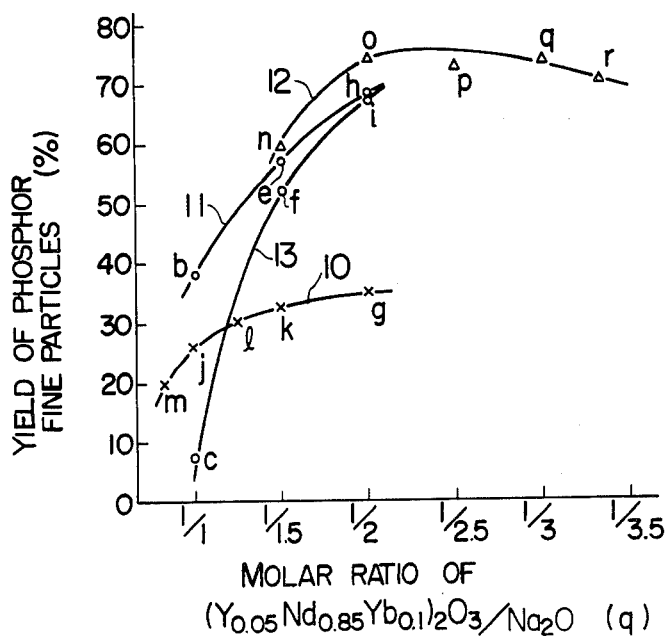

Also, as is clear from FIGS. 5 and 6, the yield remarkably increases when p is less than ¼ and is more than ⅛ and q is less than 1/1.

All the peaks of curves 7, 8 and 9 in FIG. 5, at which the yield of fine particles of phosphor becomes maximum lie on a line connecting the point $APO_3$ with the point $B_{1-x-y}Nd_xYb_yP_5O_{14}$ in FIG. 2.

Thus, at 700° C. which is the firing temperature in this example as described below, there is a region in which three phases of a melt comprising $NaPO_3$ and $Y_{0.05}Nd_{0.85}Yb_{0.10}P_5O_{14}$ and $NaY_{0.05}Nd_{0.85}Yb_{0.10}P_4O_{12}$ coexist. The yield of fine particles of phosphor becomes maximum on a tie line connecting the point $NaPO_3$ ($APO_3$ in FIG. 2) with the point $Y_{0.05}Nd_{0.85}Yb_{0.10}P_5O_{14}$ ($B_{1-x-y}Nd_xYb_yP_5O_{14}$ in FIG. 2) which shows part of this phase equilibrium, when q is kept constant and p is varied.

The molar ratios of the components at the points a, b, c, ..., s in FIGS. 5 and 6 are as shown in Table 1.

Table 1

| Point | $Y_2O_3$ | $Nd_2O_3$ | $Yb_2O_3$ | $Na_2O$ | $P_2O_5$ |
|-------|----------|-----------|-----------|---------|----------|
| m | 0.05 | 0.85 | 0.10 | 0.8182 | 5 |
| a | 0.05 | 0.85 | 0.10 | 1 | 4 |
| j | 0.05 | 0.85 | 0.10 | 1 | 5 |
| b | 0.05 | 0.85 | 0.10 | 1 | 6 |
| c | 0.05 | 0.85 | 0.10 | 1 | 8 |
| l | 0.05 | 0.85 | 0.10 | 1.25 | 5 |
| d | 0.05 | 0.85 | 0.10 | 1.5 | 4.5 |
| k | 0.05 | 0.85 | 0.10 | 1.5 | 5 |
| e | 0.05 | 0.85 | 0.10 | 1.5 | 6 |
| s | 0.05 | 0.85 | 0.10 | 1.5 | 6.5 |
| n | 0.05 | 0.85 | 0.10 | 1.5 | 7 |
| f | 0.05 | 0.85 | 0.10 | 1.5 | 8 |
| g | 0.05 | 0.85 | 0.10 | 2 | 5 |
| h | 0.05 | 0.85 | 0.10 | 2 | 6 |
| o | 0.05 | 0.85 | 0.10 | 2 | 7 |
| i | 0.05 | 0.85 | 0.10 | 2 | 8 |
| p | 0.05 | 0.85 | 0.10 | 2.5 | 7 |
| q | 0.05 | 0.85 | 0.10 | 3 | 7 |
| r | 0.05 | 0.85 | 0.10 | 3.5 | 7 |

Figure 7:
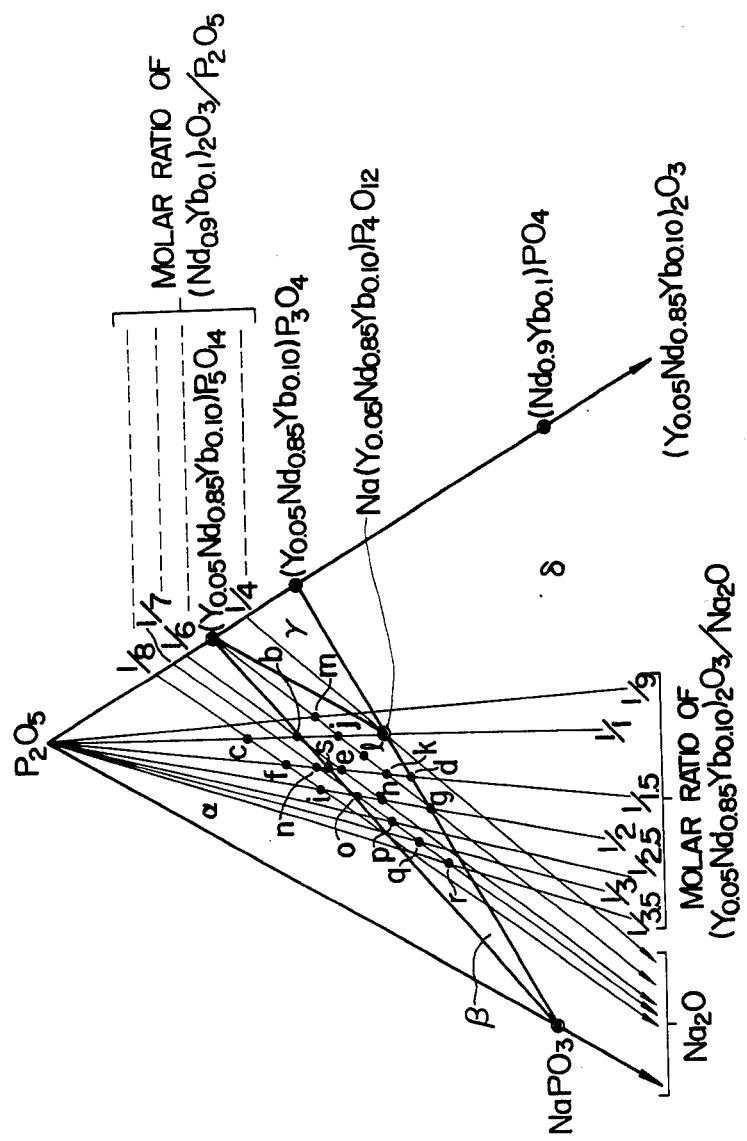
FIG. 7 is a composition diagram of $P_2O_5$-$Na_2O$-$(Y_{0.05}Nd_{0.85}Yb_{0.1})_2O_3$ ternary system wherein the respective composition points obtained in FIGS. 5 and 6 have been entered.

A composition diagram of $P_2O_5$-$Na_2O$-$(Y_{0.05}Nd_{0.85}Yb_{0.10})_2O_3$ ternary system in which the points as shown in Table 1 have been entered is FIG. 7.

As is clear from FIG. 7, most of the composition ratios of the starting materials lie within the region $\beta$. Several preferable points lie in the part of the region $\alpha$ near to the region $\beta$ since $P_2O_5$ is scattered and lost during the heating step as described above. Even if the composition ratio of the starting materials lie outside the region $\beta$, the composition of the materials on firing enters the region $\beta$ as a result of the scatter of $P_2O_5$ by heating.

The detailed procedure in this example is as follows:

As starting materials, 15.47 g of $Y_2O_3$, 391.79 g of $Nd_2O_3$ and 53.98 g of $Yb_2O_3$ were used, and amounts of $Na_2CO_3$ and $NH_4H_2PO_4$ enough to form the required starting composition were added thereto. The heating rate was 150° C./hour from room temperature to 400° C. and 350° C./hour from 400° C. to 700° C. The other conditions were the same as in Example 1.

Also, it was tried to synthesize a phosphor from the starting composition corresponding to a point 6 in FIG. 2, but no fine particles of phosphor were able to be obtained. This point 6 corresponding to $p = ¼$ and $q = 4/1$ lies in a region surrounded by three tie lines connecting the points, $NaY_{0.05}Nd_{0.85}Yb_{0.10}P_4O_{12}$, $Y_{0.05}Nd_{0.85}Yb_{0.10}P_5O_{14}$ and $Y_{0.05}Nd_{0.85}Yb_{0.10}P_3O_9$ with one another, in which region these three phases coexist. Thus, the phosphor $NaY_{0.05}Nd_{0.85}Yb_{0.10}P_4O_{12}$ does not coexist with a melt comprising $NaPO_3$. Thereby, no fine particles of phosphor can not be obtained.

On the other hand, a point 5 in FIG. 2 corresponds to $p = 1/6$ and $q = 1/1.5$ and lies in a regin wherein the phosphor $NaY_{0.05}Nd_{0.85}Yb_{0.10}P_4O_{12}$ coexists with a melt comprising $NaPO_3$. Therefore, a very preferable result can be obtained at this point.

Similar results were obtained by replacing Y as B by at least one element selected from the group consisting of Sc, La, Gd, Lu, Ga, In, Bi and Sb.

EXAMPLE 5

A phosphor represented by the formula $NaBi_{0.10}Nd_{0.80}Yb_{0.10}P_4O_{12}$ corresponding to the general formula $$AB_{1-x-y}Nd_xYb_yP_4O_{12}$$

wherein A=Na, B=Bi, x=0.80 and y=0.10, was synthesized from the following starting materials:
 $Bi_2O_3$:63.83 g
 $Nd_2O_3$:368.74 g
 $Yb_2O_3$:53.98 g
 $Na_2CO_3$:290.38 g
 $NH_4H_2PO_4$:2205.97 g The yield of fine particles of phosphor was 88.9% by weight.

Also, a phosphor represented by the formula $$NaNd_{0.7}Yb_{0.3}P_4O_{12}$$

corresponding to the general formula $$AB_{1-x-y}Nd_xYb_yP_4O_{12}$$

wherein A=Na, x=0.7 and y=0.3, was synthesized from the following starting materials:
 $Nd_2O_3$:235.53 g
 $Yb_2O_3$:118.22 g
 $Na_2CO_3$:370.96 g
 $NH_4H_2PO_4$:1610.36 g The yield of fine particles of phosphor was 81.1% by weight.

Further, a phosphor represented by the formula $$KCe_{0.05}Nd_{0.80}Yb_{0.15}P_4O_{12}$$

corresponding to the general formula $$AB_{1-x-y}Nd_xYb_yP_4O_{12}$$

wherein A=K, B=Ce, x=0.80 and y=0.15, was synthesized from the following starting materials:

$Ce_2O_3$:22.48 g
 $Nd_2O_3$:368.74 g
 $Yb_2O_3$:80.97 g
 $K_2CO_3$:283.95 g
 $NH_4H_2PO_4$:1890.83 g

The yield of fine particles of phosphor was 65.4% by weight. The conditions used such as heating rate, etc. are the same as in Example 4.

Na and K were used as A in this example, but Rb or Cs may be used in place of the Na and K. Also, a similar result can be obtained by these elements alone or in admixture.

As explained above, according to the present invention, a phosphor having a particle size of about 5 μm can be formed in a high yield without adding a pulverization step after the synthesis. Also, it was confirmed that the luminous power of the fine particulate phosphors produced according to the present invention was 3 to 6 times that of a prior art phosphor $LiNdP_4O_{12}$. Thus, according to the present invention, far excellent infrared-infrared phosphors as compared with prior art phosphors can be formed in a high yield.

The phosphors produced according to the present invention can be used for various objects. For example, when different data are printed on a card with the phosphors produced according to the present invention, an optical data card having excellent characteristics can be obtained.

What is claimed is:

1. A process for producing an infrared-infrared phosphor represented by the formula $$AB_{1-x-y}Nd_xYb_yP_4O_{12}$$

wherein A is at least one element selected from the group consisting of Na, K, Rb and Cs, B is at least one element selected from the group consisting of Sc, Y, La, Ce, Gd, Lu, Ga, In, Bi and Sb, and x and y are numbers satisfying the conditions $$0.05 \leq x \leq 1.0$$

$$0 \leq y \leq 0.95$$

$$x+y \leq 1.0$$

which comprises the steps of:
 (a) forming a mixture of starting materials;
 (b) firing the resulting mixture at a temperature of 520°–880° C. to effect a composition within the region β in FIG. 2 in the accompanying drawings, said composition being composed of a melt of $APO_3$ and said phosphor;
 (c) cooling the fired mixture;
 (d) digesting the cooled mixture with water; and
 (e) removing the liquid phase of the digested mixture and drying the insoluble residue wherein the residue includes particles of said phosphor, and wherein at least 30% by weight of said particles are about 5μm or less in size.

2. A process according to claim 1, which further comprises the step of treating the insoluble residue obtained in said step (e) with a dilute acid to remove $APO_3$.

3. A process according to claim 1, wherein the temperature for firing the resulting mixture is achieved by heating the resulting mixture at a heating rate of between 10° C./hour to 350° C./hour.

4. A process according to claim 3, wherein said heating rate is 150° C./hour.